Oct. 14, 1930.  G. A. KING  1,778,677
DOUBLE PIN SOCKET
Filed Feb. 3, 1927
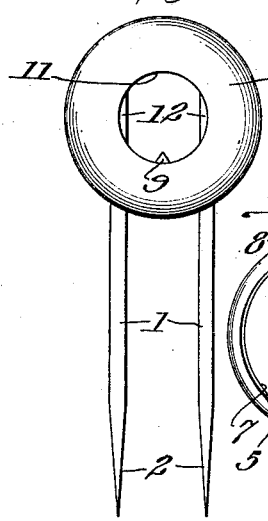
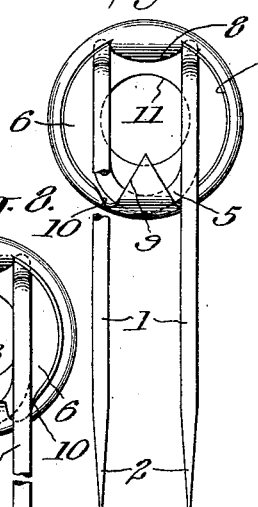
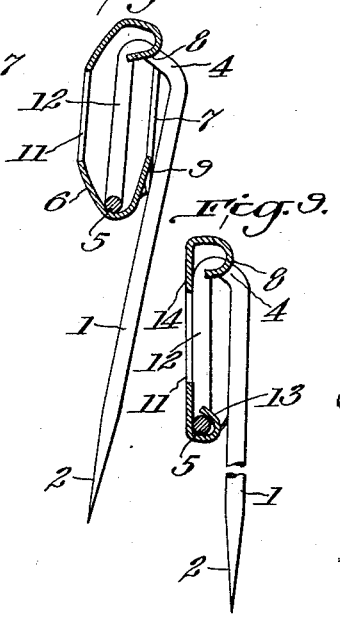
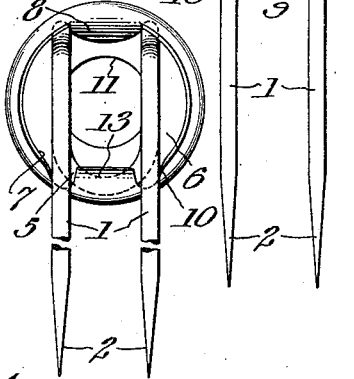
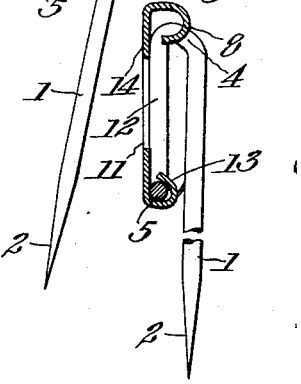
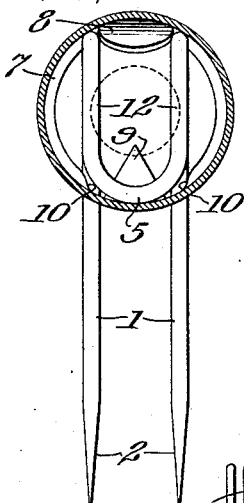
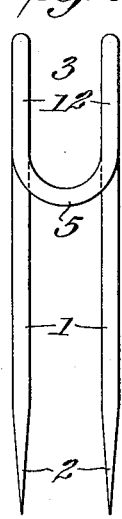
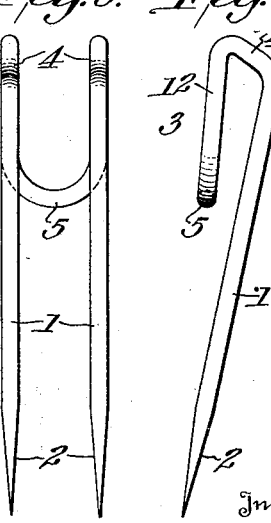
Inventor
George A. King
by
W. H. Fincuel
Attorney Patented Oct. 14, 1930

1,778,677

UNITED STATES PATENT OFFICE

GEORGE A. KING, OF WATERBURY, CONNECTICUT, ASSIGNOR TO SCOVILL MANUFACTURING COMPANY, OF WATERBURY, CONNECTICUT, A CORPORATION OF CONNECTICUT

DOUBLE-PIN SOCKET

Application filed February 3, 1927. Serial No. 165,669.

The object of this invention is to adapt the principle of the double-pointed pin fastener of the Boden, King and Chapman Patent, No. 1,604,801, granted October 26, 1926, for use with a snap-fastener element, and to this end the invention consists in substituting for the cap of that patent a cap which in conjunction with the looped head of the pin embodies a socket member for cooperation with a complemental stud member.

When used for securing covers to upholstered bodies, the stud members will be attached to the cover and the socket members will be stuck in the upholstered portions of the body and thus may be applied to register correctly with the fixed stud members, so that the stud members may be engaged with the socket members by entering the holes in the socket members and then snapped into spring-engagement with the limbs of the looped head.

In the accompanying drawings, in the several figures of which like parts are similarly designated, Figure 1 is a front view; Fig. 2 is a rear view with one limb of the pin broken away; Fig. 3 is a cross-section and Fig. 4 is a rear elevation with the cap in transverse section, illustrating one construction. Figs. 5, 6 and 7 show respectively, front, rear and side elevations of the pin detached. Fig. 8 is a rear view, and Fig. 9 is a cross section illustrating another form of the invention. Fig. 10 is a vertical cross-section of the form shown in Figs. 8 and 9, with a non-resilient stud in position, illustrating what is common to that form as well as to the other forms, in the normal strains in use being borne by non-resilient portions of the socket and stud.

The double-pointed pin shown applied in Figs. 1 to 4 and detached in Figs. 5 to 7, may be and is here shown as of substantially the construction illustrated in the Boden, King & Chapman patent above mentioned, although the invention is not limited thereto. The pin may be made of suitable wire, with its limbs 1 having pointed ends 2, a looped head 3 having the humped portion 4 and the bend 5, whereby the pin and the flanged cap 6 may be united in such way as to prevent the rotation of the cap on the pin, the flange 7 of the cap extending circumferentially around the rim of the cap at its back and engaging with the humped portions 4 and the bend 5 of the looped head 3. The looped head is bent back upon the limbs and parallel or in alignment with said limbs. The flange 7 of the cap may have the tongue 8 extending inwardly between the limbs at the head portion, and it may also have the prong 9 extending upwardly from the bottom portion of the flange between the limbs 1 so as to aid in keeping the limbs 1 separated and also to provide means for engaging the material to which the pin is applied to prevent the accidental escape of the pin therefrom and yet be capable of disengagement to permit the removal of the pin when so desired. The flange also may have the notches 10 on each side of the prong to form seats for the limbs of the pin.

So far the pin and the cap are substantially as in the patent referred to, and I will now proceed to describe the particular features of the present invention.

The cap instead of being made closed, as in the patent referred to, is made with a central opening 11 for the passage thereinto of a stud or head member of a snap fastener or separable fastener, having a circumferential groove, as usual. When such stud or head has been entered into the cap, it is engaged by the parallel side members 12 of the head of the pin which cross opposite portions of the opening 11, the resiliency of these members 12 serving to grip and hold the stud in engagement in a releasable manner in accordance with the well-known operation of snap fasteners or separable fasteners.

As shown in Fig. 8 and 9, the prong 9 may be omitted and the material 13 of the flange between the limbs 1 may be used to overlap the bend 5 of the looped head to afford an additional security for the head and cap. The outer face or front 14 of the cap may be flat instead of convex. The use of the flat face or front insures a closer fit of the parts than the convex, and thus enhances the efficiency as well as the appearance of the arrangement.

In Figs. 3 and 7 the limbs of the pin are shown as inclined forwardly, as in the Boden, King & Chapman patent above referred to, but as shown in Figs. 8 and 9, the limbs may be substantially parallel with the looped head and the flange 7.

By the constructions described, it is intended that the stud or head members of the snap fasteners shall be permanently attached to an article that is to be removably applied and the pin fasteners are then applied in proper registering position on the fixed body to be engaged by the studs.

Illustrating the use of the invention in connection with the application of covers such as are used on the seats and other upholstered parts of automobile bodies, it is to be said that the studs will be applied to the covers, and the pins will be stuck into the upholstered parts of the seats or other parts in such position as to have their socketed caps registered with the studs and to permit the socketing of the studs within the socket members. A stud 15 is shown in Fig. 10, as thus socketed.

By socket members, it is to be understood that I refer to the caps with their front openings and the utilization of the parallel sides of the heads of the pins. As will be observed in Figs. 1, 2, 4 and 8, these parallel sides of the heads cross the openings 11 and yield laterally under the pressure of the incoming or outgoing studs.

These pin sockets will be so placed in the upholstery that the normal strain after the studs are snapped in, will be principally in the plane of the points of the pins and exerted in the direction of such points. Under this strain the neck of the stud will be pulled against the edge of the hole 11 in the cap nearest the pin points with practically no more resulting strain on the spring members than when the said cover is not pulled. In some kinds of fasteners such a strain will come on a resilient element, and as the strain is increased the resilient element must yield, with the possible result of so distorting the resilient element that the fastener is spoiled. In the present invention no such injury can occur under such strains; and this is true whether the strains are exerted in the direction of the pin points, as described, or in the same plane and at right angles to that direction, since under the latter strain the resilient element would yield laterally until it is protected under the adjacent edge of the hole 11, and then the stud is pulled against the unyielding edge of said hole. Such pulls come, for instance, when a person is seating himself in an automobile and adjusting himself to position; and as already indicated, the strain is borne by non-resilient elements of the stud and socket, as indicated in Fig. 10 with reference to the down pull.

Another feature is that the cap gives a good trimming effect on the upholstery.

It will be understood from the foregoing that the makers of upholstery covers or similar attachments will ship the covers with the stud members attached, together with the required number of socket members substantially packed and sent with the covers. The user will put the pins in the upholstery by hand, registering them with the studs so that the cover will lie smoothly in place.

Variations in the details are permissible within the principle of the invention and the following claims.

What I claim is:—

1. A pin fastener, having a pin provided with a pair of pointed limbs terminating in a looped and humped head bent back upon the limbs and parallel or in alignment with said limbs, and a cap having a circumferential rim flange applied to said looped head, said cap having an opening in the face thereof to receive a stud which is engaged by the looped head of the pin to form a snap fastener.

2. A pin fastener, having a pin provided with a pair of pointed limbs terminating in a looped head bent back upon the limbs and parallel or in alignment with said limbs, said head having parallel side members which are sufficiently resilient to yield, a bend at one end and humped portions at the other end and a cap applied to the bend and humped portions of said looped head, said cap provided with an opening the opposite sides of which have the parallel side members of the looped head crossing them, same forming a socket member of a separable fastener and adapted to receive and engage a complemental stud member.

3. A socket member of a separable fastener, for use in attaching covers to upholstered bodies, to which covers is fixed the stud member of such separable fastener, said socket member comprising a double-limbed pin provided with a looped head limbed pin provided with the limbs and parallel or in bent back upon the limbs and parallel or in alignment with said limbs, said head having parallel sides, and a cap applied to said head and having an opening for the passage of the stud, the parallel sides of the looped head crossing the opening in the cap and adapted to resiliently engage the stud.

4. A socket member of a separable fastener, for use in attaching covers to upholstered bodies, to which covers is fixed the stud member of such separable fastener, said socket member comprising a double-limbed pin provided with a looped head having parallel sides, and a cap applied to said head and having a flat front provided with an opening for the passage of the stud, the parallel sides of the looped head crossing the opening in the cap and adapted to resiliently engage the stud and the limbs of the pin standing off freely from the cap and devoid of locking engagement therewith.

5. A double pin socket, including a cap having an opening to receive a complemental stud, and a double limbed pin provided with a looped head bent back upon the limbs of the pin and parallel or aligned therewith and having parallel resilient side members which cross the said opening and are thereby exposed to engagement with the stud and resiliently connected with the cap to permit such engagement, the relation of the edges of the opening in the cap, the resilient members of the pin head and the stud being such that normal strains in use are borne by non-resilient portions of the socket and stud.

6. A fastener of the class described including a flanged cap having an opening therein, a length of wire bent to provide portions underlying the flange, pin portions disposed in spaced parallel relationship to the cap and spring arm portions underlying the opening and adapted to be spread apart as a stud member is inserted through the opening.

7. A fastener of the class described including a flanged cap having an opening therein, a wire, the ends of which are bent to define a pair of parallel pins, the intermediate portion of the wire being bent back upon the pins and defining a head received within and engaged by the cap, said head-forming portion of the wire also defining a pair of spreadable spring arms disposed under the opening and adapted to yieldingly embrace the neck of a stud inserted between them through the opening, the flange including a spur portion disposed between the pins and preventing relative rotation of the cap and head.

8. A device of the class described comprising a fastener member having an opening therein to receive the stud element of a companion fastener member, an attaching pin for the said fastener member comprising spaced prongs connected by a bend and having bends formed therein at correspondingly opposite points to provide an attaching portion disposed against the fastener member, the fastener member having a lip embracing the first mentioned bend in the pin at one side of said opening in the member and being provided with an overturned rim and a lip engaging the attaching portion of the pin adjacent the second mentioned bends therein, the spaced members of the attaching portion of the pin extending across opposite sides of said opening to constitute anchoring means for the said stud member of the companion fastener.

9. A device of the character described comprising a fastener member having an opening therein to receive the stud element of a companion fastener member, an attaching pin for the said fastener member comprising spaced prongs connected by a single bend and having a pair of bends formed therein at correspondingly opposite points to provide an attaching portion disposed against the fastener member, said fastener member including means engageable over said single bend and between said pair of bends in abutting relation therewith, whereby the attaching pin is secured to the fastener member and held against displacement, said attaching pin having spaced members extending across opposite sides of said opening for engagement with stud of a companion fastener member.

10. A fastener of the class described including a flanged cap having an opening therein, a wire, the ends of which are bent to define a pair of pins, the intermediate portion of the wire being bent back upon the pins and defining a head received within and engaged by the cap, said head-forming portion of the wire also defining a pair of spreadable spring arms disposed under the opening and adapted to yieldingly embrace the neck of a stud inserted between them through the opening.

In testimony whereof I have hereunto set my hand this 2nd day of February, A. D. 1927.

GEORGE A. KING.